US005136454A

United States Patent [19]

Halferty et al.

[11] Patent Number: 5,136,454

[45] Date of Patent: Aug. 4, 1992

[54] ARRANGEMENT FOR PROVIDING GROUND FAULT PROTECTION

[75] Inventors: John P. Halferty, Lilburn; William E. May, Lawrenceville, both of Ga.

[73] Assignee: Siemens Energy & Automation, Inc., Alpharetta, Ga.

[21] Appl. No.: 640,185

[22] Filed: Jan. 11, 1991

[51] Int. Cl.[5] .............. H02H 3/26

[52] U.S. Cl. .............. 361/42; 361/45; 361/87

[58] Field of Search .............. 335/18; 361/42, 45, 361/142, 87

[56] References Cited

U.S. PATENT DOCUMENTS 3,795,841 3/1974 Klein .............. 335/18

4,020,394 4/1977 Potash .............. 361/45

4,801,910 1/1989 Ayers et al. .............. 335/230

*Primary Examiner*—A. D. Pellinen

*Assistant Examiner*—S. Jackson

[57] ABSTRACT

An arrangement for opening a circuit coupled to an electrical power source associated with a neutral circuit. The arrangement includes a bi-stable latch for electrically engaging and disengaging a pair of contacts in response to the value of the sum of currents in the circuit and the neutral circuit exceeding a predefined limit. The arrangement also includes a mechanism for opening and closing a pair of main contacts which are used to open and close the circuit. The mechanism can be operated by a shunt trip solenoid such that the solenoid causes the operating mechanism to open the contacts when the contacts of the bi-stable latch are closed.

21 Claims, 3 Drawing Sheets

ARRANGEMENT FOR PROVIDING GROUND FAULT PROTECTION

FIELD OF THE INVENTION

This invention relates to ground fault protection, and in particular, to an arrangement for detecting a ground fault condition and producing a signal for controlling a device which produces a response, such as circuit interruption, as a result of the ground fault condition.

BACKGROUND OF THE INVENTION

Typical electrical power distribution arrangements in residences include a load center having a main circuit breaker and a plurality of branch circuit breakers. The main circuit breaker serves to protect the wiring which provides electrical power from the power company into the load center, and the branch circuit breakers serve to protect the wiring extending from the load center and makes up each of the individual circuits within the residence. Typically, the main circuit breaker and branch circuit breakers provide protection for two types of faults: overload conditions and short circuit conditions.

Additionally, branch circuit breakers are available which provide ground fault protection for the individual circuits. These types of branch circuit breakers are mandated by the National Electric Code for circuits which extend into portions of the residence such as bathrooms, basements and garages, and are intended to protect personnel. To provide this protection, these branch circuit breakers are required to provide detection of ground faults (e.g., a difference in current between the neutral line and power line) above 5 milliamps within a specified time period.

While the main circuit breaker and branch circuit breakers without ground fault protection protect for overload and most short circuit conditions, these devices cannot prevent all short circuit situations. More specifically, the main and branch circuit breakers will not detect as a short circuit current, a current which is lower than its respective instantaneous tripping current or overload tripping current. Additionally, lowering an instantaneous tripping level will cause problems such as nuisance tripping, which is common when an electric motor or other device having a large inductance is coupled to the circuit.

Since the main and branch circuit breakers of a load center cannot protect against all possible short circuit conditions, damage to electrical wiring in a home which results in a short circuit between the power conductor and the neutral or ground can cause excess heating within the wiring at the point of the short circuit. As a result, this heating can further destroy the insulation around the wires and, in some situations, start a fire at the point of the short circuit. This type of damage is known to occur both in the permanent wiring of a home, as well as temporary wiring such as extension cords.

It has been found that electrical wiring which includes a ground conductor in addition to the neutral conductor, and one or more circuit conductors, will usually produce a line to ground fault when the wiring is damaged. Accordingly, protecting wiring with a circuit breaker including ground fault detection results in a significant reduction in the amount of time a wiring damaging event exists (e.g., excess heating caused by short circuit condition). More specifically, the ground fault detection feature of a circuit breaker will detect a short circuit when there is current leakage to ground.

One way of providing ground fault detection to all of the circuits extending from a load center, is to substitute branch circuit breakers including ground fault detection for all of the conventional branch circuit breakers in the load center. The main problem with this solution is cost. More specifically, a typical branch circuit breaker having the ground fault interrupt feature costs between 5 and 10 times as much as the branch circuit breaker it replaces. By way of example, a typical 100 amp load center may have the ability to hold 20 branch circuit breakers which cost in the range of $5-$10 for a total cost of between $100-$200. If branch circuit breakers having a ground fault detection feature are substituted, the cost of the circuit breakers could conceivably jump to $2,000 or more. (The cash values referred to above are estimates based upon list prices.) While this alternative is offered for consumers and electricians, they typically make their own decision to forego circuit breakers including ground fault detection due to the added cost.

In addition to costing more, providing ground fault detection at a level which provides protection for personnel (e.g., 5 milliamps of current to ground) is not required to adequately protect against low level short circuit conditions. More specifically, protecting against ground faults in the range of 300 milliamps should be adequate to protect against wiring damage caused by low level short circuits.

Accordingly, the need exists for ground fault detection which will detect a level of ground fault current which may be higher than that required for personnel protection, for all of the circuits extending from a load center which would greatly reduce damage to wiring caused by a short circuit condition which destroys the wiring insulation and causes a current flow between the power conductors, neutral and ground at the location of damage.

SUMMARY OF THE INVENTION

The invention provides an arrangement for selectively opening a first circuit coupled to a source of electrical power, wherein the source is also coupled to a neutral circuit. The arrangement includes means for electrically opening the first circuit, means for controlling the means for electrically opening, and means for producing a ground fault sensing current related to the sum of the currents in the first circuit and the neutral circuit. The arrangement also includes a bi-stable switching device coupled to the means for producing, wherein the switching device is disposed to provide a signal to the means for controlling if the ground fault sensing current exceeds a predefined limit. The means for controlling is arranged to cause the means for electrically opening to open the first circuit in response to the signal.

The present invention further provides a circuit breaker including ground fault detection. The circuit breaker includes means for electrically disengaging a first electrical contact and a second electrical contact, and means for coupling the first electrical contact to a circuit conductor coupled to an electrical power source which is also coupled to a neutral conductor. The circuit breaker also includes means for producing a current related to the sum of the currents in the circuit conductor and the neutral conductor, and a bi-stable switching device coupled to the means for producing and the means for electrically disengaging, such that the means for electrically disengaging effects the disengagement of the first and second electrical contacts when the current exceeds a predefined limit.

The invention still further provides an electrical distribution system for distributing power from an electrical power source to a plurality of branch circuits, wherein the power source comprises at least one circuit conductor and a neutral conductor. The system includes a circuit bus coupled to the circuit conductor, a neutral bus coupled to the neutral conductor, a plurality of branch circuit breakers electrically coupled to the circuit bus, and means for electrically disengaging a first electrical contact coupled to the circuit conductor and a second electrical contact coupled to the circuit bus. The system further includes means for producing a current related to the sum of the currents in the circuit and neutral buses, and a bi-stable switching device coupled to the means for producing and the means for electrically disengaging, such that the means for electrically disengaging effects the disengagement of the first and second electrical contacts when the current exceeds a predefined limit The invention also provides a method for detecting a ground fault condition in a plurality of branch circuits of an electrical distribution arrangement, wherein the arrangement includes at least one circuit conductor coupled to the branch circuits and a neutral conductor. The method includes the steps of producing a current related to the sum of currents in the circuit and neutral conductors, producing a control signal with a bi-stable switching device in response to the sum of currents exceeding a predetermined limit, and electrically disengaging the circuit conductor from the branch circuits in response to the control signal.

The invention still further provides an arrangement for selectively opening a plurality of circuits coupled to a source of electrical power. The arrangement includes means for electrically opening the plurality of circuits, means for producing a ground fault sensing current related to the sum of the currents in the plurality of circuits, and a bi-stable switching device coupled to the means for producing and the means for electrically opening. The means for electrically opening, opens the plurality of circuits when the ground fault sensing current exceeds a predefined limit.

BRIEF DESCRIPTION OF THE DRAWINGS

A preferred exemplary embodiment of circuit breaker arrangement including ground fault detection in accordance with the present invention will hereinafter be described in conjunction with the appended drawings wherein.

DETAILED DESCRIPTION OF A PREFERRED EXEMPLARY EMBODIMENT

Figure 1:
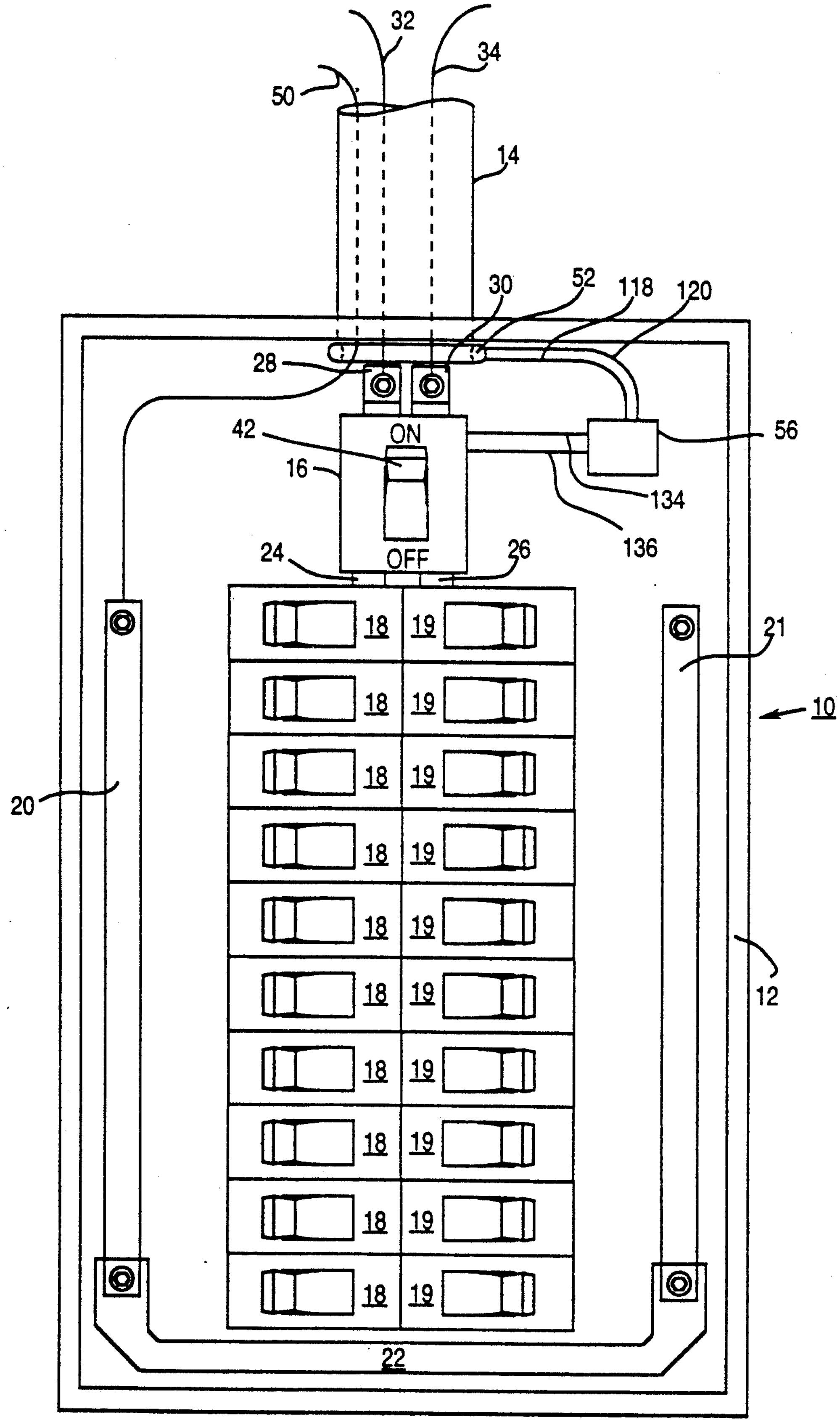
FIG. 1 is a schematic representation of an electrical power distribution system.

Referring to FIG. 1, there is illustrated an electrical power distribution system 10 (load center) including an enclosure 12, a main conduit portion 14, a main circuit breaker 16, a plurality of branch circuit breakers 18 and 19, a pair of neutral bus bars 20, 21, a neutral tie strap 22, and a pair of circuit bus bars 24 and 26. Enclosure 12 provides a support and protective enclosure for the components of system 10, and portion 14 is fixed to enclosure 12 such that a protective channel into enclosure 12 is provided for a neutral conductor 50 (circuit conductor designed to be connected to ground) and a pair of non-grounded circuit conductors 32 and 34 (circuit conductors not designed to be connected to ground). Conductors 32, 34 and 50 are coupled to a power source such as an electric utility.

Main circuit breaker 16 includes two terminals 28 and 30 to which first and second circuit conductors 32 and 34 are connected, respectively. Main circuit breaker 16 is also connected to circuit bus bars 24 and 26 by a pair of terminals 36 and 38 (see FIGS. 2A and 2B), respectively. In general, main circuit breaker 16 can be selectively operated to open and close the electrical circuits extending from terminals 28 and 30 to terminals 36 and 38 respectively. More specifically, main circuit breaker 16 includes two pair of main contacts 150 and 152 (FIG. 2C illustrates one pair of main contacts 150 and 152) which are engaged and disengaged to electrically connect and disconnect terminals 28 and 30, and terminals 36 and 38 respectively.

Figure 2A:
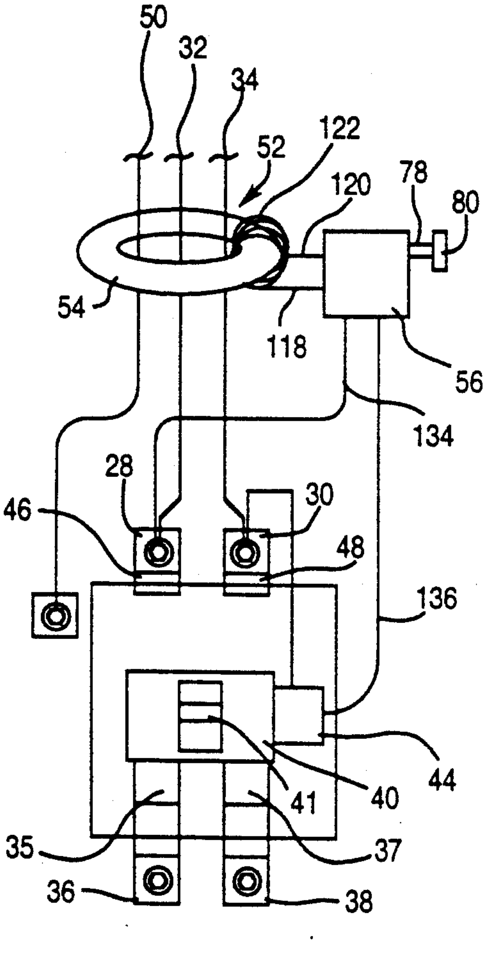
FIG. 2 is a schematic representation of a main circuit breaker with an external ground fault detection arrangement.
FIG. 2B is a schematic representation of a main circuit breaker and an arrangement for detecting ground fault enclosed within the circuit breaker housing.
FIG. 2C is a partial side view of FIGS. 2A and 2B illustrating a contact operating mechanism operatively connected to a pair of main circuit breaker contacts.
Figure 2B:
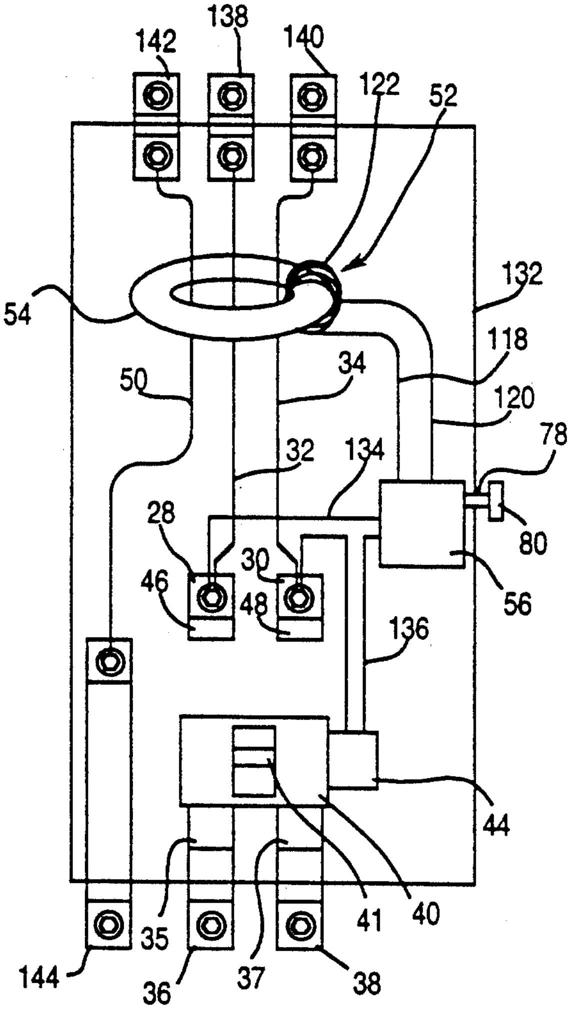
Figure 2C:
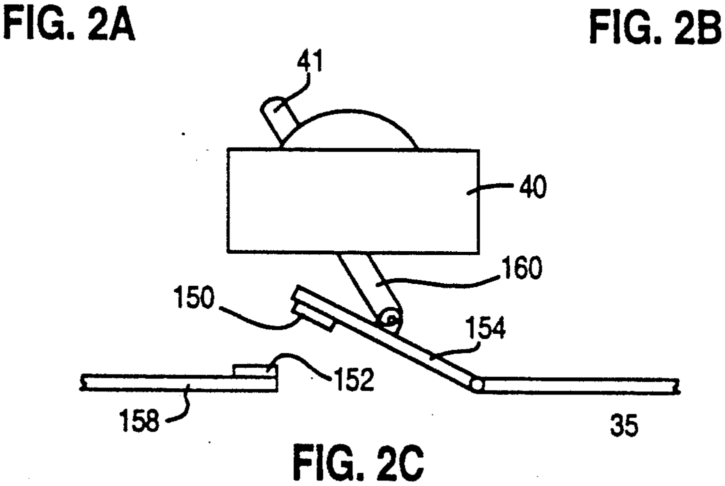

By way of example, referring to FIG. 2C, one of the main contacts 150 is coupled to terminal 36 a pivoting contact arm 154, a pivot support 156 which is connected to a bus bar portion 35. Main contact 152 is coupled to terminal 28 by a bus bar portions 158. In a similar manner, the second pair of main contacts 150 and 152 are coupled to terminal 38 via bus bar portion 37 and terminal 30 respectively.

Main contacts 150 and 152 are engaged and disengaged with a contact operating mechanism 40 (see FIGS. 2A, 2B and 2C). Mechanism 40 is coupled to pivoting contact arm 154 by a linkage 160. Linkage 160 operatively engages mechanism 40 with arm 154 to pivot the pivoting contact arms such that main contacts 150 and 152 can be engaged and disengaged. In a similar manner, the second pair of main contacts 150 and 152 engaged and disengaged.

Contact operating mechanism 40 also includes an ON/OFF switch handle 41 to allow manual engagement and disengagement of main contacts 150 and 152.

Main circuit breaker 16 is of the conventional type which includes a shunt trip solenoid 44. Solenoid 44 interacts with circuit breaker 16 such that contact operating mechanism 40 disengages main contacts 150 and 152 when solenoid 44 is energized to operate a tripping latch (not shown). The power to energize solenoid 44 can be provided by either bus bar portions 35 or 37. More specifically, solenoid 44 can be selectively coupled between either portion 35 or 37 and neutral conductor 50, or between portions 35 and 37. The selective coupling of solenoid 44 between portions 35, 37 and neutral conductor 50 will be discussed in further detail below in reference to a bi-stable latch 56 discussed in detail below. By way of example only, main circuit breaker 16 having a solenoid 44 may be a Siemens Model No. Q212500S01, wherein mechanism 40 may be of the type used in this type of circuit breaker.

Branch circuit breakers 18 and 19 are electrically engaged with bus bars 24 and 26, respectively. These circuit breakers are of the conventional type found in a residential load centers and provide overload and short circuit protection for the branch circuits to which they are coupled. While main circuit breaker 16 for a residential load center will typically be between a 100 and 200 amp circuit breaker, branch circuit breakers 18 and 19 will typically be between 10 and 20 amp circuit breakers. By way of example only, branch circuit breakers 18 and 19 may be Siemens Model No. Q115 circuit breakers.

Depending upon the portion of the residence which a given branch circuit services, a branch circuit breaker 18, 19 may include ground fault protection circuitry. More specifically, if branch circuit breaker 18 or 19 protects a branch circuit servicing a bathroom, the National Electrical Manufacturer's Code (NEMA) requires that the particular circuit breaker trip within a predetermined amount of time when a ground fault condition is present in the branch circuit (e.g., the absolute value of the sum of the currents in the neutral and circuit conductor of the branch circuit is greater than 5 milliamps).

Neutral conductor 50 is connected to bus bar 20 which is connected to neutral bus bar 21 by neutral tie strap 22. This arrangement of bus bars 20 and 21 provides a neutral connection for each of the branch circuits having it circuit conductor connected to a respective circuit breaker 18 or 19.

Referring again more particularly to FIGS. 2A and 2B, there is illustrated a current transformer 52 having a core 54 encircling conductors 32, 34, and 50. Current transformer 52 is connected to a bi-stable latch 56. Bi-stable latch 56 includes a pair of auxiliary contacts 58 and 60 (FIG. 3) which are connected in parallel with the trip contacts of unit 44. Accordingly, if auxiliary contacts 58 and 60 of trip latch 56 are closed, unit 44 causes mechanism 40 to open the main contacts of circuit breaker 16 in the same manner as when the trip contacts of unit 44 are closed.

Figure 3:
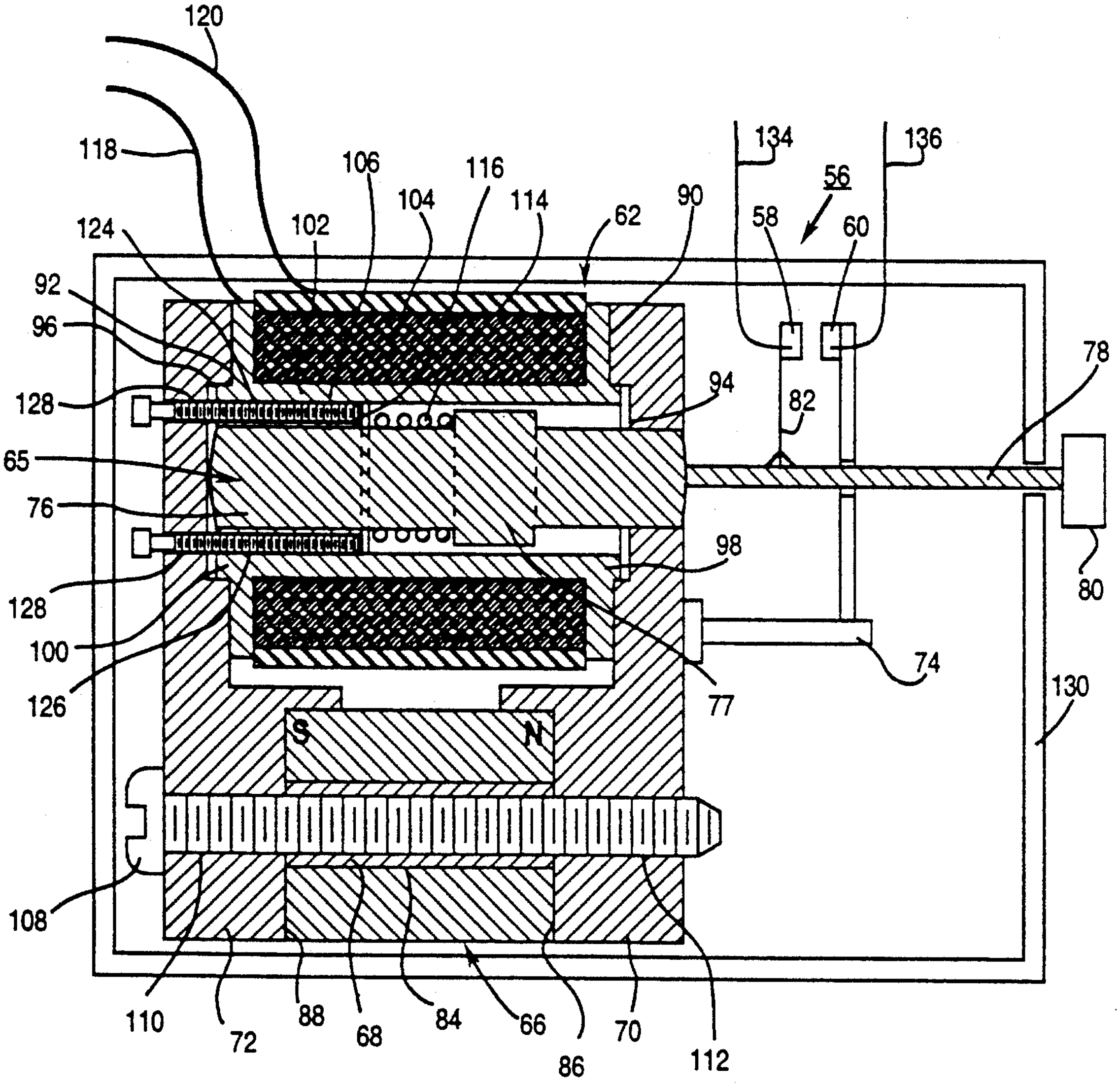
FIG. 3 is a cross-sectional view of a bi-stable contactor.

The details of bi-stable latch 56 will now be described in reference to FIG. 3. Latch 56 also includes a housing 130 which supports and protects the components of latch 56. The main components of bi-stable latch 56 are disclosed and discussed in detail in U.S. Pat. No. 4,801,910 issued to Ayers, et al. on Jan. 31, 1989, the disclosure of which is incorporated herein by reference. Unlike the magnetic actuating mechanism disclosed in U.S. Pat. No. 4,801,910, bi-stable latch 56 utilizes a coil 62 which only includes one set of windings, whereas the actuating mechanism U.S. Pat. No. 4,801,910 includes a coil having two sets of windings.

Latch 56 includes movable auxiliary contact 58, stationary auxiliary contact 60, coil 62, an armature 65, a permanent magnet 66, a non-magnetic spacer 68, a pair of magnetic side members 70 and 72, and a stationary contact support member 74. Armature 65 includes a cylindrical body 76 and an actuating rod 78. Armature 65 is preferably machined from a magnetic material to include a shoulder 77. Actuating rod 78 is pressed into an opening machined in the end of armature 65. Actuating rod 78 includes a push button portion 80 and a support member 82 for supporting movable contact 58 relative to actuating rod 78. To provide adequate contact between contacts 58 and 60, member 82 may be fabricated to function as a leaf spring. Support member 74 supports contact 60 relative to member 70.

Permanent magnet 66 is in the form of a bar magnet which includes a mounting hole 84 formed along the longitudinal axis of magnet 66 which extends from the north pole (N) of magnet 66 to the south pole (S). The hole is formed such that spacer 68 can slide through the hole to prevent damage to magnet 66 during assembly of latch 56. Magnetic members 70, 72 each include a permanent magnet mounting surface 86 and 88, respectively, and a coil mounting surface 90 and 92, respectively. Each coil mounting surface 90 and 92 include a recess 94 and 96, respectively, each adapted to accept a shoulder section 98 and 100 of a coil bobbin 102.

Coil 62 includes plastic bobbin 102, and a winding 104 which has approximately 6,000 turns. Bobbin 102 also includes a guide opening 106 within which armature 65 can translate. Latch 56 is assembled such that a screw 108, passing through an opening 110 in side member 72, spacer 68 and a threaded opening 112 in side member 70, clamps permanent magnet 66 and coil 62 between side members 70 and 72.

In operation, armature 65 is biased toward side member 72 against the compressive force of a spring 114, which is exerted between shoulder 77 and a ring 116, by permanent magnet 66. In particular, armature 65 is biased against the compressive force of spring 114 since, when armature 65 is in this position, the reluctance of the magnetic circuit defined by magnet 66, side member 70, side member 72, and armature 65, is at its lowest. Winding 104 is set up such that when energized via leads 118 and 120, it produces a magnetic flux opposite to that of permanent magnet 66. When the magnetic flux of winding 104 reaches a predetermined level, armature 65 is driven away from side member 72 toward side member 70 by the force of spring 114 in combination with the shift in flux caused by winding 104. Accordingly, upon moving toward side member 70, armature 65 drives actuating rod 78 and member 82 such that contact 58 electrically engages contact 60.

Bobbin 102 also includes two threaded openings 124 and 126, each adapted to accept an adjustment screw 128 which passes through openings in side member 72. Screws 128 bear against ring 116 such that when screws 128 are turned in, the compressive force exerted by spring 114 upon armature 65 when armature 65 is in contact with side member 72, can be increased. Accordingly, to decrease the amount of flux required from winding 104 to urge armature 65 toward side member 70, screws 128 would be adjusted inwardly. To increase the amount of flux required from winding 104 to urge armature 65 toward side member 70, screws 128 would be turned to translate screws 128 outward from bobbin 102.

Referring again to FIGS. 2A and 2B, these Figures illustrate two different arrangements of bi-stable latch 56, current transformer 52, and main circuit breaker 16. In particular, the arrangement of FIG. 2A is associated with a ground fault detection and protection arrangement to be retrofitted to an existing electrical power distribution system 10, such that main circuit breaker 16 in system 10 does not have to be replaced. FIG. 2B illustrates an arrangement wherein bi-stable latch 56, current transformer 52, and the components of main circuit breaker 16 are all enclosed in a single enclosure 132. Enclosure 132 and the components located therein may be arranged and configured such that enclosure 132 and its contents can be used to replace main circuit breaker 16 of system 10.

The operation of the arrangements in FIGS. 2A and 2B are substantially similar. More specifically, both arrangements provide short circuit and overload protection via mechanism 40 and trip unit 44, and provide ground fault protection (e.g., low level short circuit) via current transformer 52, bi-stable latch 56, trip unit 44, and contact operating mechanism 40.

In operation, auxiliary contacts 58 and 60 are coupled in parallel with the trip contacts of unit 44 by a pair of conductors 134 and 136. Where main circuit breaker 16 remains in system 10 and is retrofitted with bi-stable latch 56, lines 134 and 136 are connected to trip unit 44 such that the trip and auxiliary contacts are in parallel. Additionally, current transformer 52 is arranged to encircle circuit conductors 32 and 34, and neutral conductor 50, as shown in FIG. 1. Where the arrangement of FIG. 2B is used to replace main circuit breaker 16, circuit conductors 32 and 34, and neutral conductor 50 are connected to terminals 138, 140 and 142 (FIG. 2B), respectively. Additionally, terminals 36 and 38 are connected to bus bars 24 and 26, and a terminal 144 is connected to neutral bus bar 20.

In operation, trip unit 44 will activate mechanism 40 to open the main contacts when the absolute value of the sum of the currents in conductors 32, 34, and 50 exceed a predetermined limit. The current induced in lines 118 and 120 is high enough to shift the flux in latch 56 and cause armature 65 to move toward side member 70 such that shoulder 77 engages member 70, thereby placing contact 58 in electrical contact with contact 60. As discussed above, when contacts 58 and 60 come into contact, trip unit 44 will cause operating mechanism 40 to open the main contacts. Until bistable trip latch 56 is reset, trip unit 44 will prevent mechanism 40 from moving the main contacts in electrical engagement. Accordingly, armature 65 must be translated toward side member 72 manually via push button portion 80 and actuating rod 78 so that contacts 58 and 60 are taken out of electrical engagement.

While one exemplary embodiment of the invention and several modifications thereof have been described in detail herein, it should be understood that the system and method of the present invention may have other applications in addition to providing ground fault detection and protection to a power distribution system. For example, the system and method may be used with an appropriately modified motor contactor to provide ground fault protection for a motor.

It should also be understood that, under certain circumstances, it may be advantageous to arrange bi-stable latch 56 and solenoid 44 so that the auxiliary contacts are normally closed instead of normally open. By way of another example, solenoid 44 may be replaced with a conventional trip unit which is controllable by opening or closing auxiliary contacts 134 and 136. Additionally, conventional trip units also have the ability to monitor the currents in a plurality of circuit conductors via current transformers associated with the circuit conductors. Accordingly, in operation, the trip unit would cooperate with contact operating mechanisms 40 such that the main contacts would be disengaged as a result of the activation of latch 56 due to a ground fault condition, or as a result of the current in on or more of the circuit conductors exceeding a predefined limit.

By way of still another exemplary modification, such as the application of the present invention to a three-phase system, current transformer 52 may be arranged such that only the currents in the non-grounded circuit conductors are summed. Accordingly, the electrical circuits coupled to the non-grounded circuit conductors would be opened if the sum of the currents in the conductors were to exceed a predefined limit.

We claim:

1. An arrangement for selectively opening a first circuit coupled to a source of electrical power, the source also being coupled to a neutral circuit, the arrangement comprising:

means for opening the first circuit;

means for controlling the means for opening;

means for producing a ground fault sensing current related to the sum of the currents in the first circuit and the neutral circuit;

a winding coupled to the means for producing such that the ground fault sensing current is applied to the winding to produce a first flux;

a first auxiliary contact;

a second auxiliary contact;

an armature connected to the first auxiliary contact, wherein the armature translates between a first position and a second position relative to the winding, and the first auxiliary contact engages the second auxiliary contact when the armature is in the second position;

means for biasing the armature; and a permanent magnet arranged to produce a second flux which maintains the armature in the first position against a force produced by the means for biasing, wherein the first flux and the means for biasing urge the armature to the second position when the first flux exceeds a predefined flux level.

2. The arrangement of claim 1, wherein the means for electrically opening comprises:

a first main contact coupled to the first circuit;

a second main contact coupled to the first circuit; and an operating mechanism arranged to disengage the main contacts to effect the opening of the first circuit.

3. The arrangement of claim 1, wherein the means for producing comprises a current transformer.

4. The arrangement of claim 1, wherein the means for controlling comprises:

a trip solenoid electrically coupled to the neutral circuit; and means for electrically coupling the trip solenoid to the first circuit such that the trip solenoid is energized to cause the means for opening to open the first circuit if the auxiliary contacts are engaged.

5. The arrangement of claim 1, wherein the means for biasing is a spring and the compressive force of the spring is adjustable to effect selection of the predefined flux level.

6. A circuit breaker including ground fault detection, the circuit breaker comprising:

means for electrically disengaging a first electrical contact and a second electrical contact;

means for coupling the first electrical contact to a circuit conductor coupled to an electrical power source which is also coupled to a neutral conductor;

means for producing a current related to the sum of the currents in the circuit conductor and the neutral conductor;

a winding coupled to the means for producing such that the ground fault sensing current is applied to the winding to produce a first flux;

a first auxiliary contact;

a second auxiliary contact;

an armature connected to the first auxiliary contact, wherein the armature translates between a first position and a second position relative to the winding, and the first auxiliary contact engages the second auxiliary contact to produce a ground fault signal when the armature is in the second position;

means for biasing the armature; and a permanent magnet arranged to produce a second flux which maintains the armature in the first position against a force produced by the means for biasing, wherein the first flux and the means for biasing urge the armature to the second position when the first flux exceeds a predefined flux level.

7. The circuit breaker of claim 6, wherein the means for electrically disengaging comprises an operating mechanism for engaging and disengaging the electrical contacts.

8. The circuit breaker of claim 6, wherein the means for producing comprises a current transformer.

9. The circuit breaker of claim 6, wherein the means for biasing is a spring and the compressive force of the spring is adjustable to effect selection of the predefined flux level.

10. The circuit breaker of claim 6, wherein the means for electrically disengaging comprises:

a trip solenoid electrically coupled to the neutral conductor; and means for electrically coupling the trip solenoid to the circuit conductor such that the trip solenoid is energized to effect disengagement of the first and second contacts in response to the engagement of the first and second auxiliary contacts.

11. An electrical distribution system for distributing power from an electrical power source to a plurality of branch circuits, wherein the power source comprises at least one circuit conductor and a neutral conductor , the system comprising:

a circuit bus coupled to the circuit conductor;

a neutral bus coupled to the neutral conductor;

a plurality of branch circuit breakers electrically coupled to the circuit bus;

a first electrical contact coupled to the circuit conductor;

a second electrical contact coupled to the circuit bus;

means for electrically disengaging the first and the second electrical contacts;

means for producing a current related to the sum of the currents in the circuit and neutral buses;

a winding coupled to the mean for producing such that the ground fault sensing current is applied to the winding to produce a first flux;

a first auxiliary contact;

a second auxiliary contact;

an armature connected to the first auxiliary contact, wherein the armature is arranged to translate between a first position and a second position relative to the winding, and the first auxiliary contact engages the second auxiliary contact when the armature is in the second position;

means for biasing the armature; and a permanent magnet arranged to produce a second flux which maintains the armature in the first position against a force produced by the means for biasing, wherein the first flux and the means for biasing urge the armature to the second position when the first flux exceeds a predefined flux level.

12. The system of claim 11, wherein the means for electrically disengaging comprises an operating mechanism for engaging and disengaging the electrical contacts.

13. The system of claim 11, wherein the means for producing comprises a current transformer.

14. The system of claim 11, wherein the means for electrically disengaging comprises:

a trip solenoid electrically coupled to the neutral conductor; and means for electrically coupling the trip solenoid to the circuit conductor such that the trip solenoid is energized to effect disengagement of the first and second contracts in response to the engagement of the first and second auxiliary contacts.

15. The system of claim 11, wherein the means for biasing is a spring and the compressive force of the spring is adjustable to effect selection of the predefined flux level.

16. An arrangement for selectively opening a plurality of circuits coupled to a source of electrical power, the arrangement comprising:

means for opening the plurality of circuits;

means for producing a ground fault sensing current related to the sum of the currents in the plurality of circuits;

a winding coupled to the means for producing such that the ground fault sensing current is applied to the winding to produce a first flux;

a first auxiliary contact;

a second auxiliary contact;

an armature connected to the first auxiliary contact, wherein the armature translates between a first position and a second position relative to the winding, and the first auxiliary contact engages the second auxiliary contact when the armature is in the second position;

means for biasing the armature; and a permanent magnet arranged to produce a second flux which maintains the armature in the first position against a force produced by the means for biasing wherein the first flux and the means for biasing urge the armature to the second position when the first flux exceeds a predefined flux level.

17. The arrangement of claim 16, wherein the means for electrically opening comprises:

a first main contact coupled to one of the circuits;

a second main contact coupled to the one of the circuits; and an operating mechanism arranged to disengage the main contacts to effect the opening of the one of the circuits.

18. The arrangement of claim 16, wherein the means for producing comprises a current transformer disposed about the plurality of circuits.

19. The arrangement of claim 16, wherein the means for electrically opening comprises:

a trip solenoid electrically coupled to one of the plurality of circuits; and means for electrically coupling the trip solenoid to another of the plurality of circuits such that the trip solenoid is energized to cause the means for opening to open the plurality of circuits when the auxiliary contacts are engaged.

20. The arrangement of claim 16, wherein the means for biasing is a compression spring and the compressive force of the spring is adjustable to effect selection of the predefined flux level.

21. The arrangement of claim 16, wherein the means for electrically opening comprises:

a trip unit responsive to the engagement of the auxiliary contacts to cause the means for opening to open the plurality of circuits when the auxiliary contacts are engaged;

the trip unit comprising:

a plurality of current transformers arranged to produce a sensing currents related to load currents n the plurality of circuit conductors; and means for monitoring the sensing current to cause the means for opening to open the plurality of circuits when the sensing current exceeds a predefined current.

* * * * *